United States Patent
Chen

(10) Patent No.: US 9,218,560 B2
(45) Date of Patent: Dec. 22, 2015

(54) DEVICE AND METHOD FOR ESTABLISHING A DATA LINKAGE BETWEEN A RFID TAG AND AN OBJECT TO PERFORM TAGGING TEST

(75) Inventor: Horng-Ji Chen, Hsinchu (TW)

(73) Assignee: CLARIDY SOLUTIONS, INC., Hsinchu (TW)

( * ) Notice: Subject to any disclaimer, the term of this patent is extended or adjusted under 35 U.S.C. 154(b) by 458 days.

(21) Appl. No.: 13/333,467

(22) Filed: Dec. 21, 2011

(65) Prior Publication Data

US 2012/0161937 A1 Jun. 28, 2012

(30) Foreign Application Priority Data

Dec. 23, 2010 (TW) ................................ 99145441 A

(51) Int. Cl.
*G08B 21/00* (2006.01)
*G06K 19/077* (2006.01)
*G06K 19/07* (2006.01)

(52) U.S. Cl.
CPC ...... *G06K 19/07749* (2013.01); *G06K 19/0722* (2013.01)

(58) Field of Classification Search
CPC ...... G06K 17/00; G06K 7/0008; G07G 1/009
USPC ............................................. 705/16; 235/375
See application file for complete search history.

(56) References Cited

U.S. PATENT DOCUMENTS

| 2003/0001725 | A1* | 1/2003 | Moore .................. 340/10.3 |
| 2006/0109496 | A1* | 5/2006 | Brown et al. ........... 358/1.15 |
| 2008/0065496 | A1* | 3/2008 | Fowler et al. ............. 705/16 |
| 2008/0231423 | A1* | 9/2008 | Maeda et al. ............ 340/10.1 |
| 2009/0231142 | A1* | 9/2009 | Nikitin et al. ........... 340/572.8 |
| 2009/0293423 | A1* | 12/2009 | Schuller et al. .......... 53/131.2 |

* cited by examiner

*Primary Examiner* — Mark Rushing
(74) *Attorney, Agent, or Firm* — Locke Lord LLP; Tim Tingkang Xia, Esq.

(57) ABSTRACT

The present invention relates to a radio frequency identification (RFID) tagging device and method, using which a RFID tag which is designed to attach an object is first linking the object information of an object and an RFID tag with programmed memory data or UID (unique identification) code, being scanned and detected in view of optimizing the RFID tag's signal strength and its effective read rate as well so as to determine a position for the RFID tag to attach thereat while allowing the detection to the RFID tag to be prevented from being adversely affected by metals or magnetic materials, and promising to achieve the optimization of the RFID system applications.

5 Claims, 6 Drawing Sheets

DEVICE AND METHOD FOR ESTABLISHING A DATA LINKAGE BETWEEN A RFID TAG AND AN OBJECT TO PERFORM TAGGING TEST

CROSS-REFERENCE TO RELATED APPLICATIONS

This non-provisional application claims priority under 35 U.S.C. §119(a) on Patent Application No. 099145441 filed in Taiwan, R.O.C. on Dec. 23, 2010, the entire contents of which are hereby incorporated by reference.

TECHNICAL FIELD

The present invention relates to an RFID tagging device and method, and more particularly, to an RFID tagging plan for performing operations including: linking the object information of an object and an RFID tag with programmed memory data or UID (unique identification) code, moving the RFID tag on the object, detecting the RFID tag to have a maximum received signal strength and effective read rate, ensuring the proper location of the RFID tag attachment of the object, and that minimize the interferences of magnetic stripe or metallic materials from the article and promising to achieve the optimization of the RFID system applications.

TECHNICAL BACKGROUND

Radio-frequency identification (RFID) is a technology that uses communication via radio waves to exchange data between a reader and an electronic tag attached to an object, for the purpose from identification to tracking. Generally, a radio-frequency identification system involves RFID readers, RFID tags, and an application system. It is noted that the RFID system can be designed to operate using different radio frequencies under different regulations, the operating frequencies include low-frequency (LF) at 134 KHz typically, high-frequency (HF) at 13.56 MHz, ultra-high-frequency (UHF) at 860~960 MHz, and microwave at 2.4 GHz, and so on. The passive RFID tags have no power source internally and require an external electromagnetic field, that is mostly emitted from RFID readers, to power and activate an internal analog circuit embedded in the passive RFID tags for the chip operations. Generally, such an RFID tag can be embedded with memories for data storage, and the memories can be read-only memories (ROM), write-once-read-many (WORM) memories or electrically erasable programmable read-only memories (EEPROM). Since the passive RFID tags and readers utilize the electromagnetic waves to transfer energy and signals, and their signal transmission performance, especially the frequency response of the RFID tags' antennas, can easily be affected by the material characteristics of the objects on which the RFID tags are attached, or even by the metallic objects as well as the conductive materials that are located neighboring thereto. That is, the metallic objects as well as the conductive materials, whichever are distributed neighboring to an RFID tags, will cause an interference phenomenon to be generated by a degree depending on the volume/area of those conductive materials and also the distances there between, that will affect the reading performance of the RFID system. Moreover, since the electromagnetic waves used for signal transmission in the RFID system are invisible waves, neither the constructive interference nor the destructive interference caused by those surrounding metallic objects or conductive materials are not perceptible. Consequently, it can be a very time consuming job just to determine where and how to attach a passive RFID tag on an object in those conventional RFID systems, since it is simply a try-and-error task that the passive RFID tag usually will have to be attached to the object again and again at different positions for obtaining different read rates accordingly so as to be used as base for locating a most appropriate position on the object for the RFID tag to attach thereto.

Generally, in a conventional RFID system, whether an RFID tag is fabricated with good quality for enabling the same to function normally, or whether the RFID tag is placed at an appropriate location or simply being placed properly can be determined according to its received signal strength indication (RSSI) or its read rate, and in a situation when the RSSI is weak or the read rate is poor while it is assured that the RFID tag is not working properly, it can be determined that the RFID tag is not located correctly and should be moved to other position. However, a common RFID tag is not built to be attached to and detached from an object repetitively in the abovementioned try-and-error manner so as to be placed properly that the RFID tag can be damaged during the repetitive processes, and moreover, such repetitive attaching and detaching will wear down the adhesion of the RFID tag, and thus the RFID tag might lose accidently and unintentionally even after being positioned properly. Nevertheless, no matter the RFID tag is damaged during the repetitive processes or is moved accidentally and unintentionally even after being positioned properly, there is a conceivable waste in resource, time and manpower already.

TECHNICAL SUMMARY

In view of the disadvantages of prior art, the primary object of the present invention is to provide an RFID tagging device and method, and more particularly, to an RFID tagging plan for performing operations including: linking the object information of an object and an RFID tag with programmed memory data or UID (unique identification) code, moving the RFID tag on the article, detecting an RFID tag to have a maximum signal strength and effective read rate, ensuring the proper location of the RFID tag attachment of the article, and that minimize the interferences of magnetic stripe or metallic materials from the article and promising to achieve the optimization of the RFID system applications.

During the performing of the tagging procedure, an RFID tag should be enabled to link to the object information of an object which it is attached thereof, the object information can be accessed from the database of the main computer through the digital communication, or be transferred with a memory device, such as a SD card, a CF card, an XD card, or an USB flash memory, and thereby, importing the object information into a database. If an object already has an attached or printed barcode, the barcode can be read with a build-in barcode reader or an external barcode reader, and then use the build-in RFID reader (it is noted that an RFID reader supports both read and write functions of the RFID tags) with a predesigned encoding rule to program into the EPC memory or writable memory, and also link with database for further processing. In some conditions, it is also capable to link with database by the UID (unique identification) code of the RFID tag. In addition, it is important to perform a qualification for verifying and checking whether the RFID tag is capable of working properly.

When an object is prepared to attach an RFID tag, the object and the RFID tag can be placed on an RFID tag reading window which is an adjustable area with non-conductive material on the shielding box for performing the tagging operation. Thereafter, the qualified RFID tag that is placed on the object and is scanning by an RFID reader to have the signal strength and the effective read rate of the RFID tag as well so as to determine a position on the object for the RFID tag to attach thereat. During the RFID reader scanning, the RFID tag is capable of moving horizontally, and the signal strength and the read rate are displayed on a built-in display unit or an external display unit, such as LCD, flat panel display and CRT, etc. It is noted that there are different color combinations of a plurality of light indicators in conjunction with certain audio components to represent various detected results with respect to the predefined criteria, and therefore, the light color combinations and audio sounds can be used as reminders or alarms that are very useful to the operator to determine the proper attachment location of the RFID tag.

After the RFID tag is fixedly attached to the object, the RFID tagging device of the invention will initiate another scanning process upon the RFID tag in view of verifying the signal strength and the effective read rate of the attached RFID tag so as to make sure whether the tagging of the RFID tag on the object is completed correctly. However, since different objects can be different in the production process or the machining procedure. Especially some library books whichever already have magnetic stripes embedded therein can have their magnetic stripes to be attached to any pages thereof at any random positions, e.g. one can have its magnetic stripe attached at page 5 at the top thereof while another can have its magnetic stripe to be attached to page 200 at the bottom thereof, not to mention that different magnetic stripes can be pasted in a book with different page separation, heights, lengths and thicknesses. With the RFID-based object tagging device and method of the invention, one can assure that each and every RFID tag can be attached to their corresponding target object at positions with optimized signal response, and thus the performance of each RFID tag is optimized. Moreover, it is noted that the detected results in view of different signal strengths and read rates that are obtained during the scanning of the RFID tag while the RFID tag is being driven to move can be recorded and registered into a database so as to be used in an optimization analysis and control.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DESCRIPTION OF THE EXEMPLARY EMBODIMENTS

For your esteemed members of reviewing committee to further understand and recognize the fulfilled functions and structural characteristics of the disclosure, several exemplary embodiments cooperating with detailed description are presented as the follows.

Figure 1:
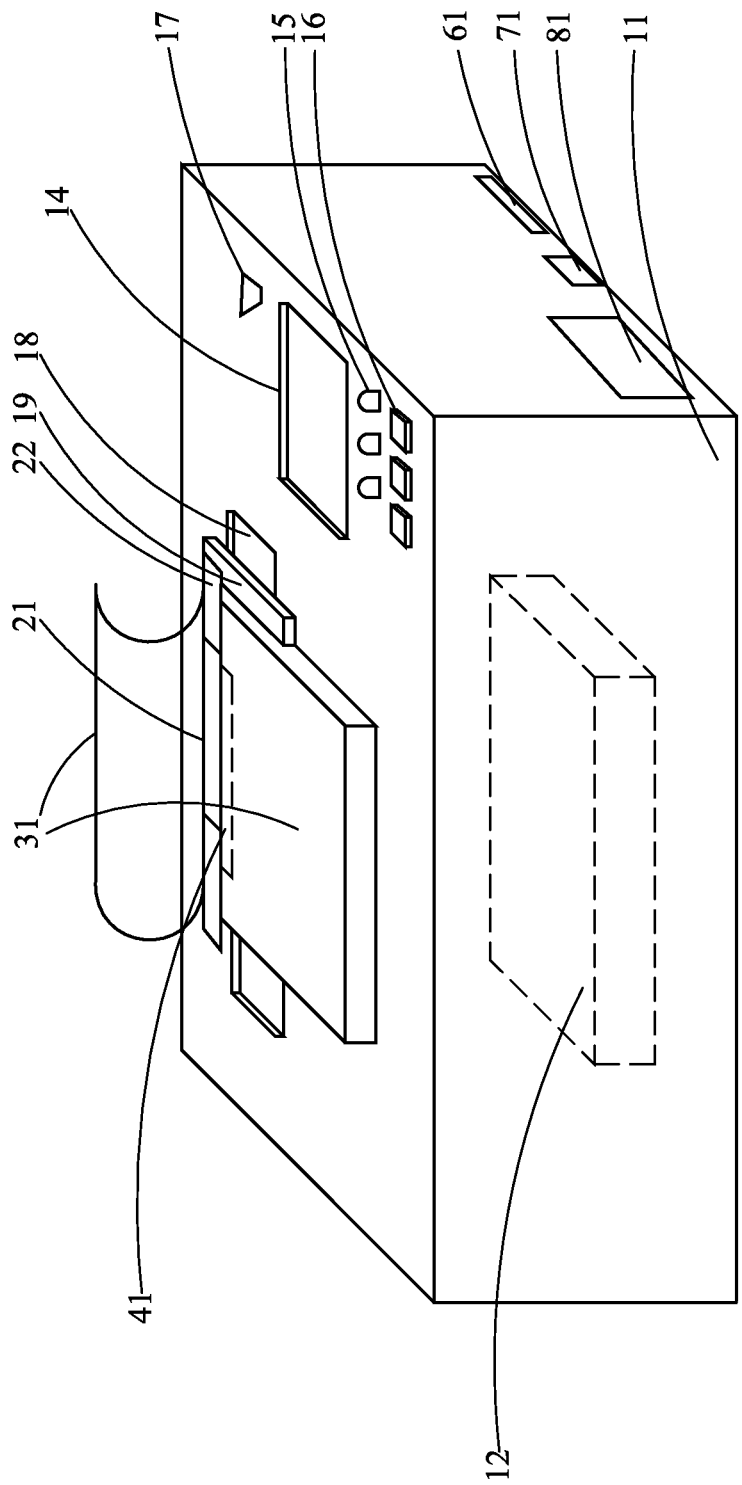
FIG. 1 shows an RFID tagging device according to one embodiment of the present invention.

FIG. 1 shows an RFID tagging device according to one embodiment of the present invention. A shielding box 11 is consisted of metallic material to reduce the external electromagnetic interference and has at least one RFID tag reading window 18 being constructed therein where electromagnetic waves from an RFID reader antenna 12 are allowed to transmit energy and signals so as to perform the access of the RFID tag 21 through the reading window 18 and the RFID reader antenna 12, which may be an reader antenna to electrically connect to a built-in RFID reader or by an RF coaxial cable to connect with an internal or external RFID reader. Each of the metallic plates 114 of the shielding box is further being covered by a wave absorbing plate 115 that are disposed inside the shielding box 11 for reducing the interference and reflection of electromagnetic waves inside the shielding box so as to enhance the reading accuracy toward RFID tags 21. The message can be shown on the display unit 14, and the indicators consist of lights 15 with different colors, and/or audio device 17 such as a speaker or a buzzer. The lights 15 indicate with on-off control or different flash rates and the audio device 17 is capable of outputting a series of audio signals, sounds of different frequencies, sound streams with different tempos, or music of different melodies, whichever is capable of pointing out the status relating to the testing to the RFID tag 21. As shown in FIG. 1, the RFID tagging device further comprises: at least one press-key 16, mounted on the surface of the enclosure case for activating controls relating to the object tagging operations, such as code reading, encoding and detecting; and a digital interface 71, being a device selected from the group consisting of: an Ethernet device, an RS-232 interface device, an RS-485 interface device, an RS-422 interface device and an USB interface device, whichever is capable of establishing a link to a computer or a server for on-line processing. In an embodiment of the invention, the RFID tagging device can use the digital interface 71 to connected to a memory card 61, such as an SD card, a CF card, an XD card and an USB flash memory, so as to transmit any object information stored in the memory card to the RFID tagging device. When the object had the barcode, it must use the original barcode to perform the data writing/linkage with the RFID tag 21. The barcode reader 81, which is a built-in barcode reader or an external barcode reader is designed to connect with digital interface so as to facilitate the performing of the linking operation between the RFID tag 21 and the object information. For accelerating the object tagging operation, the RFID tagging device further comprises: an adjustable object position plate 19, disposed at a position on top of the RFID tag reading window 18, which can prearrange an object 31 being same or nearly same with the object to perform the tagging test so as to search out the perfected position to perform the object tagging operation. It is noted that the positioning of the adjustable object position plate 19 is determined so as to quickly locate the succeeding object according to the reading efficiency of the RFID tag. The adjustable object position plate 19 can be fixed at a specific location while the variation of the RFID tag position is minimized in certain conditions.

Figure 2A:
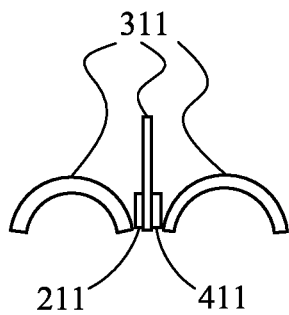
FIG. 2A/2B/2C illustrates the relative position between the RFID tag and magnetic stripe or the metal material.
Figure 2B:
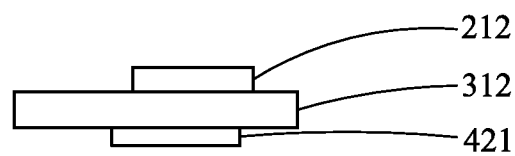
Figure 2C:
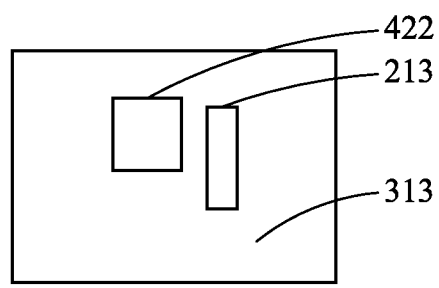

According to different applications, the RFID tags 21, 211 may be attached inside the object (for example, books 31, 311, which have a magnetic stripe or a metal material 41, 411, for example, magnetic stripe, stapling, metallic layer printing, etc.), or the RFID tag 212 and the magnetic stripe or metal material 422 are respectively attached on the same side or different side of the tagging object 313. Moreover, the distance between the RFID tag and the magnetic strip or metal material becomes shorter, and it will affect the read efficiency of the RFID tag. Referring to the RFID tagging device of FIG. 1 and the position between the RFID tag and the magnetic stripe or the metal material of FIGS. 2A, 2B, and 2C. By enabling the RFID tag 213 to move horizontally above the object relative to the magnetic stripe or the metal material 422, the RFID tagging device and method of the invention can assure to find a position on the object for allowing the RFID tag 213 to attach thereat with optimized signal response, and thus the performance of the RFID tag 213 is optimized.

Consequently, the detection results obtaining from the step of performing a data accessing test upon an RFID tag, the step of moving of the RFID tag relative to the object while performing a scanning operation upon the moving RFID tag, and the step of the scanning and detecting of the RFID tag that is attached to the object in view of its signal strength and read rate so as to verify whether the signal strength and read rate of the RFID tag reaches the predefined criteria are all being stored in a test information database or a test information file which can be used in an optimization control analysis and further performance optimization.

Figure 3A:
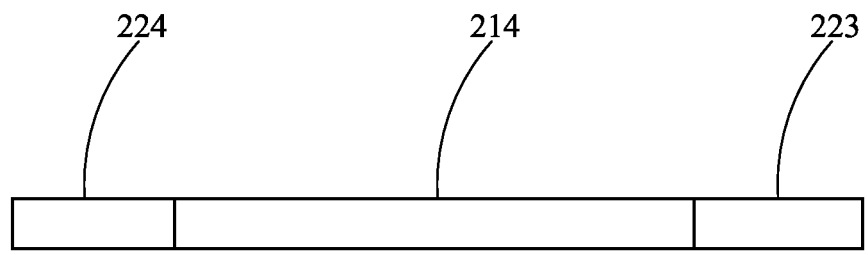
FIGS. 3A and 3B shows a schematic diagram of the RFID tag structure in the present invention.
Figure 3B:
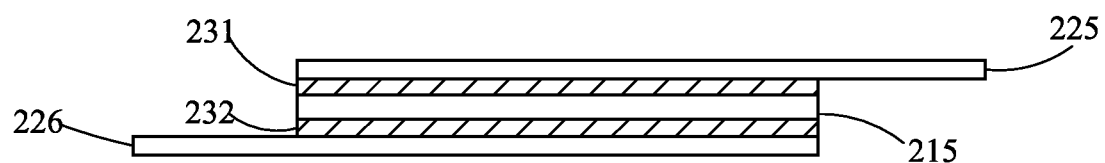
Figure 4A:
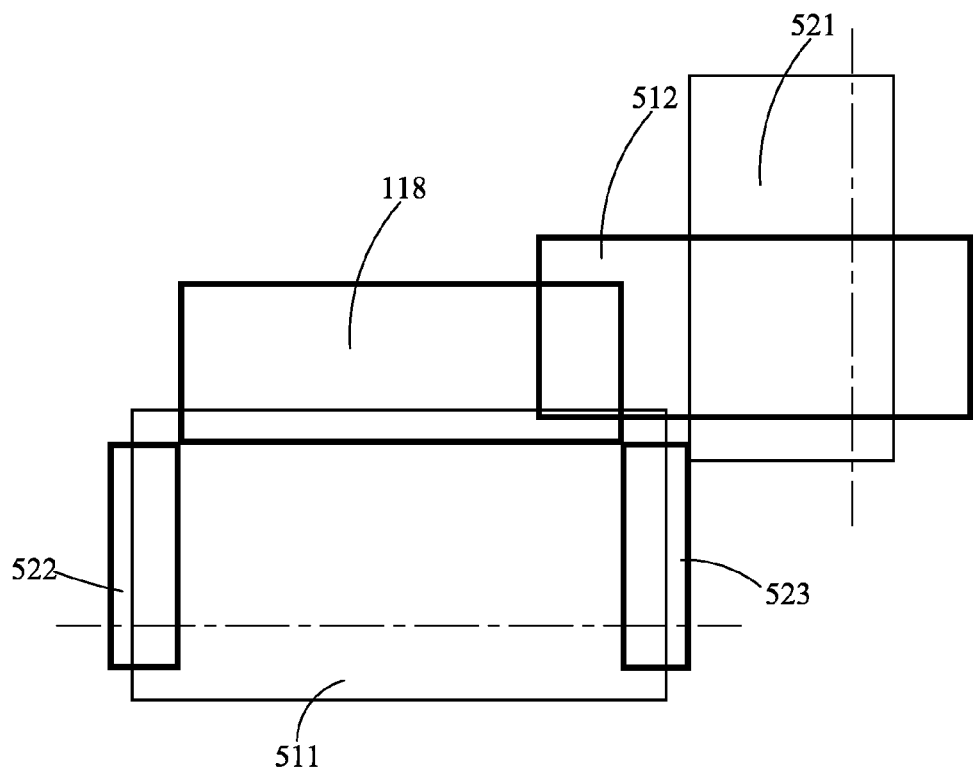
FIGS. 4A/4B/4C/4D respectively show a structural schematic diagram showing a cover structure of the RFID tag reading area on the shielding box.
Figure 4B:
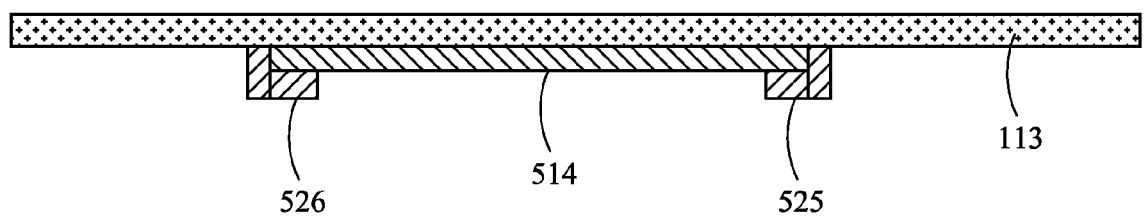
Figure 4C:
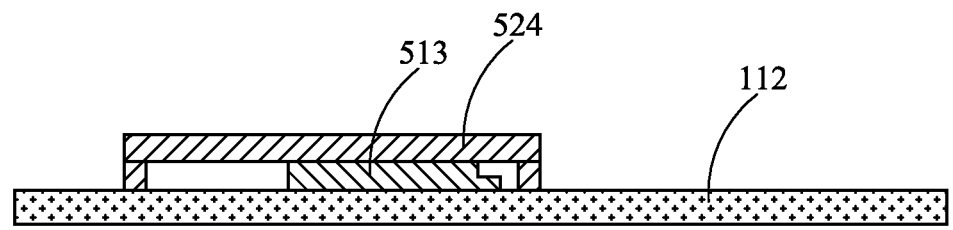
Figure 4D:
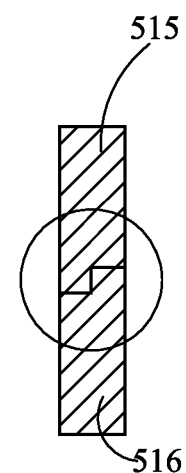
Figure 5:
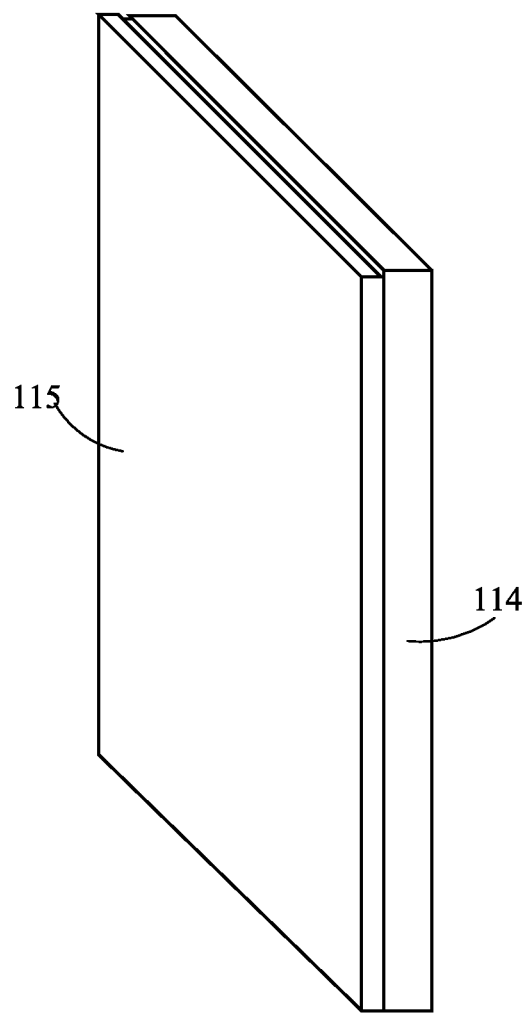
FIG. 5 is a schematic diagram showing how a metal plate of the shielding box is attached with an electromagnetic wave absorbing material in the present invention.

Please refer to FIG. 3A and FIG. 3B, which are schematic diagrams showing an RFID tag used in the present invention. As shown in FIG. 3A and FIG. 3B, for facilitating the horizontal moving and the tagging of the RFID tag 214, the RFID tag 214 has two release papers 223, 224 to be adhered respectively on the top and bottom of the same in a manner that the two release papers 223, 224 are arranged extruding out of the RFID tag 214 as the two release paper 223, 224 is formed longer than the RFID tag 214. It is noted that the length of each release paper 223, 224 can be determined according to actual requirement only if it can facilitate the horizontal moving and the tagging of the RFID tag 214. In FIG. 3B, the configuration, from top to bottom, includes: an upper release paper 225, an upper adhesive layer 231, an RFID tag 215, a lower adhesive layer 232 and a lower release paper 226. However, if there is only one surface of the RFID tag 214 that is designed to attached to a target object, the configuration can include only the upper release paper 225, the upper adhesive layer 231, and the RFID tag 215, without the lower adhesive layer 232 and the lower release paper 226, or vice versa.

FIGS. 4A, 4B, 4C and 4D respectively show a structural schematic diagram showing a cover RFID tag reading area. In order to satisfy different size of RFID tags, the size of the RFID tag reading window 181 must larger than the width and the length of RFID tag. However, different types have different sizes for the RFID tags. For easy adjusting the size of RFID tag reading window 181 and decreasing the probability of overflowing out electromagnetic wave from the shielding box, it designs two metal sliding slices 511, 512 under the cover so as to adjust the size of the RFID tag reading window 181. The U-type metal sliding slot base 521 and the L-type metal sliding slot base 522, 523 are jointed with the cover in the structure. In the right cross-sectional diagram, the cover 112 and U-type metal sliding slot base 524 are the fixing, joining and the metal sliding slice 513 may slide inside the U-type metal sliding slot base 524; in the front cross-sectional diagram, the cover 113 and the L-type sliding slot bases 525 and 526 are the fixing joining, and the metal sliding slice 514 may slide inside the U-type and L-type metal sliding slot bases; the engage surface is enclose by the up and down overlap for achieving the enclose result when the metal sliding slice 515 is closer to the metal sliding slice 516. Thereby, it will avoid generating the gap so as to prevent the electromagnetic wave overflowing from the engage surface. It is noted that for some applications the RFID tag reading window can be designed as a fixed area while the RFID tags are quite similar in sizes and the metal sliding slices and metal sliding slot bases can be eliminated.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A RFID tagging method, comprising:
    establishing a data linkage between a RFID tag and an object to store an object information in the RFID tag;
    placing the object on a RFID tagging device and moving a predefined tagging zone of the object over an RFID tag reading window of the RFID tagging device, wherein the predefined tagging zone is for attaching the RFID tag;
    keeping repeatedly moving the RFID tag back and forth over the predefined tagging zone of the object;
    scanning and detecting the RFID tag with the RFID tagging device in view of its signal strength and read rate when the RFID tag is repeatedly moving back and forth over the predefined tagging zone of the object; and
    enabling the RFID tagging device to issue a reminding signal at the moment while the detected signal strength and read rate are compared with a predefined criteria and then stopping moving the RFID tag at the position where the RFID tag meets the predefined criteria;
    attaching the RFID tag to the object at the position where the RFID tag meets the predefined criteria; and
    performing a tagging test to verify the RFID tag to make sure the signal strength and read rate of the RFID tag meet the predefined criteria.

2. The tagging method of claim 1, wherein a data accessing test further comprises:
    using the RFID tagging device to access data stored in a memory of the RFID tag; and
    using the RFID tagging device to scan and detect the RFID tag in view of its signal strength and read rate so as to determine whether the RFID tag is capable of working normally.

3. The tagging method of claim 2, further comprising:
    establishing a link between the qualified RFID tag and the object information corresponding to an barcode and then encoding the object information using a specific encoding rule so as to be registered into the memory of the RFID tag; and
    accessing the memory of the RFID tag for obtaining the object information so as to verify the data linkage to the RFID tag.

4. The RFID tagging method of claim 1, wherein after completing the attaching operation, the RFID tagging device is activated for scanning and detecting the RFID tag which is attached to the object in view of its signal strength and read rate so as to verify whether the signal strength and read rate of the RFID tag reaches the predefined criteria.

5. The RFID tagging method of claim 1, wherein the detecting results obtained from the step of performing the data accessing test upon an RFID tag, a step of moving of the RFID tag relative to the object while performing a scanning operation upon the moving RFID tag, and a step of the scanning and detecting of the RFID tag that is attached to the object in view of its signal strength and read rate so as to verify whether the signal strength and read rate of the RFID tag reaches the predefined criteria are all being stored in a test information database or a test information file which can be used in an optimization control analysis and further performance optimization.

\* \* \* \* \*